(12) United States Patent
Wakasugi

(10) Patent No.: US 10,981,418 B2
(45) Date of Patent: Apr. 20, 2021

(54) TIRE

(71) Applicant: SUMITOMO RUBBER INDUSTRIES, LTD., Hyogo (JP)

(72) Inventor: Masashi Wakasugi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 167 days.

(21) Appl. No.: 16/185,728

(22) Filed: Nov. 9, 2018

(65) Prior Publication Data
US 2019/0160880 A1 May 30, 2019

(30) Foreign Application Priority Data

Nov. 27, 2017 (JP) .............................. JP2017-226866
Nov. 27, 2017 (JP) .............................. JP2017-226867

(51) Int. Cl.
*B60C 11/03* (2006.01)
*B60C 11/12* (2006.01)

(52) U.S. Cl.
CPC ...... *B60C 11/0302* (2013.01); *B60C 11/0304* (2013.01); *B60C 11/0306* (2013.01); *B60C 11/1204* (2013.01); *B60C 11/1236* (2013.01); *B60C 11/1263* (2013.01); *B60C 11/1281* (2013.01); *B60C 2011/036* (2013.01); *B60C 2011/039* (2013.01); *B60C 2011/0344* (2013.01); *B60C 2011/0355* (2013.01);
(Continued)

(58) Field of Classification Search
CPC ............. B60C 11/0302; B60C 11/1204; B60C 11/0306; B60C 11/0304; B60C 2011/036; B60C 2011/039; B60C 2011/0362; B60C 2011/0355; B60C 11/1263; B60C 11/1281; B60C 11/1236; B60C 2011/0344
See application file for complete search history.

(56) References Cited

U.S. PATENT DOCUMENTS

2015/0210121 A1* 7/2015 Sanae ................. B60C 11/1204
152/209.8
2016/0236517 A1* 8/2016 Nagase ............... B60C 11/0304

FOREIGN PATENT DOCUMENTS

EP 0802073 A1 10/1997
JP 2016-13820 A 1/2016
(Continued)

OTHER PUBLICATIONS

Search Report issued in European Patent Office (EPO) Patent Application No. 18205296.9, dated Apr. 11, 2019.
(Continued)

*Primary Examiner* — Timothy Kennedy
*Assistant Examiner* — Olukorede Esan
(74) *Attorney, Agent, or Firm* — Greenblum & Bernstein, P.L.C.

(57) ABSTRACT

A tire comprises a tread portion. The tread portion comprises a first tread edge, a shoulder main groove extending continuously in a tire circumferential direction between the first tread edge and a tire equator, and a shoulder land region defined between the first tread edge and the shoulder main groove. The shoulder land region is provided with a shoulder sipe extending in a tire axial direction with a width less than 1.5 mm. The shoulder sipe includes a narrow sipe portion and a wide sipe portion having a width larger than that of the narrow sipe portion. The wide sipe portion is arranged on a side of the shoulder main groove.

20 Claims, 15 Drawing Sheets

(52) U.S. Cl.
CPC ............... *B60C 2011/0362* (2013.01); *B60C 2011/1254* (2013.01)

(56) References Cited

FOREIGN PATENT DOCUMENTS

| | | |
|---|---|---|
| JP | 2016-182927 A | 10/2016 |
| WO | 2014/096935 A1 | 6/2014 |

OTHER PUBLICATIONS

U.S. Appl. No. 16/185,583 to Masashi Wakasugi et al., which was filed on Nov. 9, 2018.
U.S. Appl. No. 16/185,702 to Mahito Arai et al., which was filed on Nov. 9, 2018.

\* cited by examiner

TIRE

TECHNICAL FIELD

The present invention relates to a tyre provided with a shoulder sipe.

BACKGROUND ART

Japanese unexamined Patent Application Publication No. 2016-13820 has proposed providing a shoulder sipe extending in a tyre axial direction in a shoulder land region of a pneumatic tyre in order to suppress uneven wear of the shoulder land region.

However, in recent years, as vehicle performance is improved, not only improvement of anti-wear performance but also further improvement of steering stability are required.
As a result of various experiments, inventors of the present invention obtained a finding that the steering stability can be improved while maintaining wear resistance of the shoulder land region by improving the shoulder sipe.

SUMMARY OF THE INVENTION

The present invention was made in view of the above, and a primary object thereof is to provide a tyre capable of exerting excellent steering stability while suppressing the uneven wear of the shoulder land region.

In one aspect of the present invention, a tyre comprises a tread portion comprising a first tread edge, a shoulder main groove extending continuously in a tyre circumferential direction between the first tread edge and a tyre equator, and a shoulder land region defined between the first tread edge and the shoulder main groove, wherein the shoulder land region is provided with a shoulder sipe extending in a tyre axial direction with a width less than 1.5 mm, the shoulder sipe includes a narrow sipe portion and a wide sipe portion having a width larger than that of the narrow sipe portion, and the wide sipe portion is arranged on a side of the shoulder main groove.

In another aspect of the invention, it is preferred that the wide sipe portion is connected with the shoulder main groove.

In another aspect of the invention, it is preferred that the narrow sipe portion is connected with the first tread edge.

In another aspect of the invention, it is preferred that a length in the tyre axial direction of the narrow sipe portion is larger than a length in the tyre axial direction of the wide sipe portion.

In another aspect of the invention, it is preferred that a depth of the wide sipe portion is larger than a depth of the narrow sipe portion.

In another aspect of the invention, it is preferred that a direction of the tread portion when mounted on a vehicle is specified, and when the tyre is mounted on a vehicle, the first tread edge is located on an outer side of the vehicle.

In another aspect of the invention, it is preferred that the shoulder land region is provided with a plurality of the shoulder sipes arranged at intervals in the tyre circumferential direction, and a shoulder lateral groove extending from the first tread edge and terminating without being connected with the shoulder main groove is arranged between a pair of the shoulder sipes adjacent to each other in the tyre circumferential direction.

In another aspect of the invention, it is preferred that an inner end in the tyre axial direction of the shoulder lateral groove is located on an outer side in the tyre axial direction of an outer end in the tyre axial direction of the wide sipe portion of each of the shoulder sipes.

In another aspect of the invention, it is preferred that the shoulder land region is provided with a narrow groove portion having a width not less than 1.5 mm and a depth not more than 2.0 mm, and the wide sipe portion extends inwardly in a tyre radial direction from a groove bottom of the narrow groove portion.

In another aspect of the invention, it is preferred that the narrow groove portion extends from the shoulder main groove and terminates between an outer end in the tyre axial direction of the wide sipe portion and the first tread edge.

In another aspect of the invention, it is preferred that in a connecting portion of the narrow groove portion with the shoulder main groove, a portion between at least one of groove walls and a tread ground contacting surface is chamfered so that the groove width gradually increases toward the shoulder main groove.

In another aspect of the invention, it is preferred that the tread portion includes a crown main groove extending adjacently to the shoulder main groove and continuously in the tyre circumferential direction, and a crown land region defined between the shoulder main groove and the crown main groove, the crown land region is provided with a crown sipe extending in the tyre axial direction with a width less than 1.5 mm, the crown sipe includes a first crown sipe crossing the crown land region, the first crown sipe includes a narrow sipe portion and a wide sipe portion having a width larger than that of the narrow sipe portion, and the wide sipe portion of the first crown sipe is connected with the shoulder main groove.

In another aspect of the invention, it is preferred that the narrow sipe portion of the first crown sipe is connected with the crown main groove.

In another aspect of the invention, it is preferred that a length in the tyre axial direction of the narrow sipe portion of the first crown sipe is larger than a length in the tyre axial direction of the wide sipe portion of the first crown sipe.

In another aspect of the invention, it is preferred that the crown sipe includes a second crown sipe extending from the crown main groove and having a terminating end terminating within the crown land region.

In another aspect of the invention, it is preferred that the terminating end is located on a side of the crown main groove of an end portion on a side of the crown main groove of the wide sipe portion of the first crown sipe.

In another aspect of the invention, it is preferred that the crown land region is provided with a narrow groove portion having a groove width not less than 1.5 mm and a groove depth not more than 2.0 mm, and the wide sipe portion of the first crown sipe extends inwardly in the tyre radial direction from a groove bottom of the narrow groove portion.

In another aspect of the invention, it is preferred that in a connecting portion of the narrow groove portion with the shoulder main groove, a portion between at least one of groove walls and a tread ground contacting surface is chamfered so that the groove width gradually increases toward the shoulder main groove.

In another aspect of the invention, it is preferred that the shoulder sipe is arranged so as to be continuous with the first crown sipe with the shoulder main groove therebetween.

In another aspect of the invention, it is preferred that the shoulder sipe includes a portion linearly continuous with the first crown sipe with the shoulder main groove therebetween.

DESCRIPTION OF THE PREFERRED EMBODIMENT

An embodiment of the present invention will now be described below in detail in conjunction with accompanying drawings.

Figure 1:
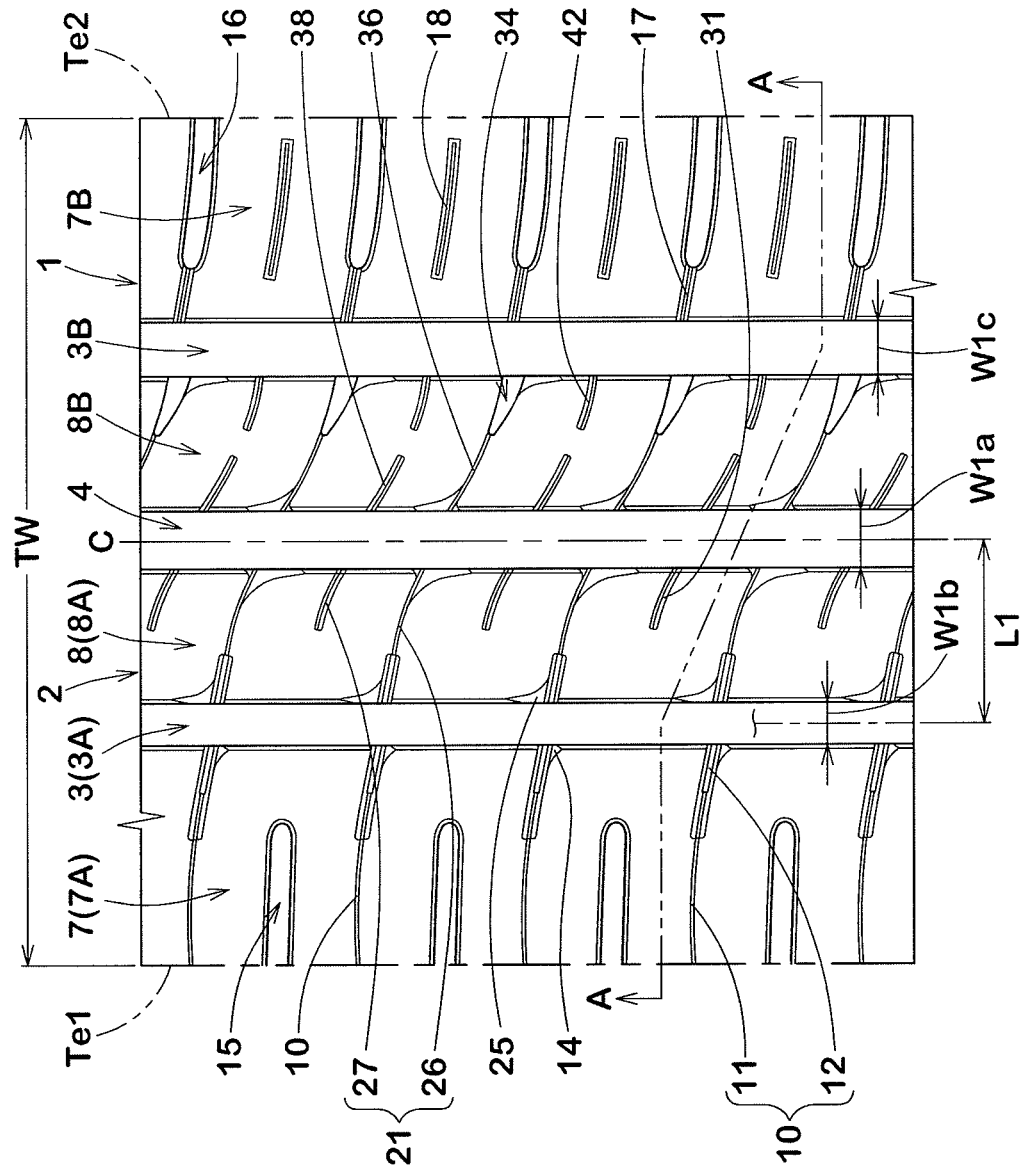
FIG. 1 is a development view of a tread portion of a tyre as an embodiment of the present invention.

FIG. 1 is a development view of a tread portion 2 of a tyre 1 showing an embodiment of the present invention. The tyre 1 in this embodiment can be used for various tyres such as a pneumatic tyre for a passenger car and for heavy load, and a non-pneumatic tyre not filled with pressurized air therein, for example. The tyre 1 in this embodiment is suitably used as a pneumatic tyre for a passenger car, for example.

As shown in FIG. 1, the tyre 1 in this embodiment has the tread portion 2 whose position when mounted on a vehicle is specified, for example. However, the present invention is not limited to such an embodiment. The tread portion 2 has a first tread edge (Te1) located, when the tyre 1 is mounted on a vehicle, on an outer side of the vehicle and a second tread edge (Te2) located on an inner side of the vehicle when the tyre is mounted on the vehicle, for example. The mounting position of the tyre 1 on a vehicle is indicated by a letter or a symbol on one of sidewall portions (not shown), for example.

In a case of a pneumatic tyre, the tread edges (Te1) and (Te2) are defined as outermost ground contacting positions in the tyre axial direction of the tyre 1 when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, unless otherwise noted, dimensions and the like of various parts of the tyre are values measured in the standard state.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

In the tread portion 2 in this embodiment, main grooves extending continuously in a tyre circumferential direction are provided, for example. The main grooves include a shoulder main groove 3 provided between the first tread edge (Te1) and a tyre equator (C) or between the second tread edge (Te2) and the tyre equator (C), and a crown main groove 4 arranged adjacently to the shoulder main groove 3, for example.

The shoulder main groove 3 in this embodiment includes an outer shoulder main groove 3A provided between the first tread edge (Te1) and the tyre equator (C), and an inner shoulder main groove 3B provided between the second tread edge (Te2) and the tyre equator (C), for example.

It is preferred that each of the shoulder main grooves 3 is arranged so that a distance L1 between a groove center line thereof and the tyre equator (C) is in the range of from 0.20 to 0.30 times a tread width TW, for example. The tread width TW is a distance in the tyre axial direction in the standard state between the first tread edge (Te1) and the second tread edge (Te2).

For example, one crown main groove 4 is provided between two shoulder main grooves 3, and in this embodiment, it is provided on the tyre equator (C). However, it is not limited to such an embodiment, and two crown main grooves 4 may be provided so as to sandwich the tyre equator (C), for example.

It is preferred that a groove width ($W1a$) of the crown main groove 4 is larger than a groove width ($W1b$) of the outer shoulder main groove 3A and a groove width ($W1c$) of the inner shoulder main groove 3B, for example. Specifically, it is preferred that the groove width ($W1a$) of the crown main groove 4 is in the range of from 1.25 to 1.35 times the groove width ($W1b$) of the outer shoulder main groove 3A. Thereby, it is possible that excellent wet performance is obtained.

It is preferred that the groove width (W1c) of the inner shoulder main groove 3B is greater than the groove width (W1b) of the outer shoulder main groove 3A, for example. Specifically, it is preferred that the groove width (W1c) of the inner shoulder main groove 3B is in the range of from 1.20 to 1.28 times the groove width (W1b) of the outer shoulder main groove 3A.

In order to improve the steering stability on a dry road surface and the wet performance in a good balance, it is preferred that the groove width (W1a) of the crown main groove 4, the groove width (W1b) of the outer shoulder main groove 3A, and the groove width (W1c) of the inner shoulder main groove 3B are each in the range of from 4.0% to 7.0% of the tread width TW, for example. Note that when dimensions of the grooves are shown in this specification, the dimensions not including chamfers are shown.

Figure 2:
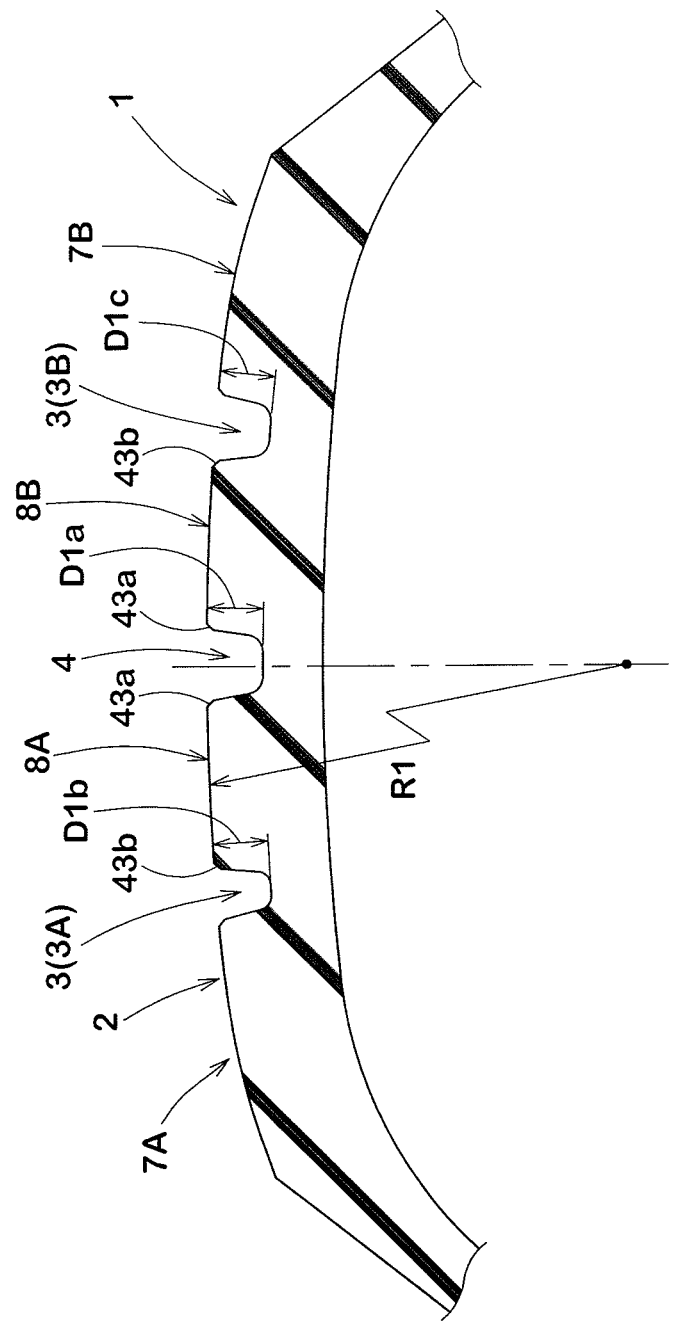
FIG. 2 is a cross-sectional view taken along A-A line of FIG. 1.

FIG. 2 is a cross-sectional view taken along A-A line of FIG. 1. As shown in FIG. 2, a groove depth (D1a) of the crown main groove 4, a groove depth (D1b) of the outer shoulder main groove 3A, and a groove depth (D1c) of the inner shoulder main groove 3B are in the range of from 6.0 to 12.0 mm, for example.

As shown in FIG. 1, the tread portion 2 in this embodiment is divided into shoulder land regions 7 and crown land regions 8 by the main grooves described above. The shoulder land regions 7 are each defined between one of the tread edges and its adjacent one of the shoulder main grooves 3. The shoulder land regions 7 in this embodiment include an outer shoulder land region 7A and an inner shoulder land region 7B, for example. The outer shoulder land region 7A is defined between the first tread edge (Te1) and the outer shoulder main groove 3A. The inner shoulder land region 7B is defined between the second tread edge (Te2) and the inner shoulder main groove 3B.

The crown land regions 8 are defined between two shoulder main grooves 3A and 3B. The crown land regions 8 includes an outer crown land region 8A and an inner crown land region 8B, for example. The outer crown land region 8A is defined between the outer shoulder main groove 3A and the crown main groove 4. The inner crown land region 8B is defined between the inner shoulder main groove 3B and the crown main groove 4. However, the present invention is not limited to such an embodiment, and three crown land regions 8 may be defined between two shoulder main grooves 3, for example.

Figure 3:
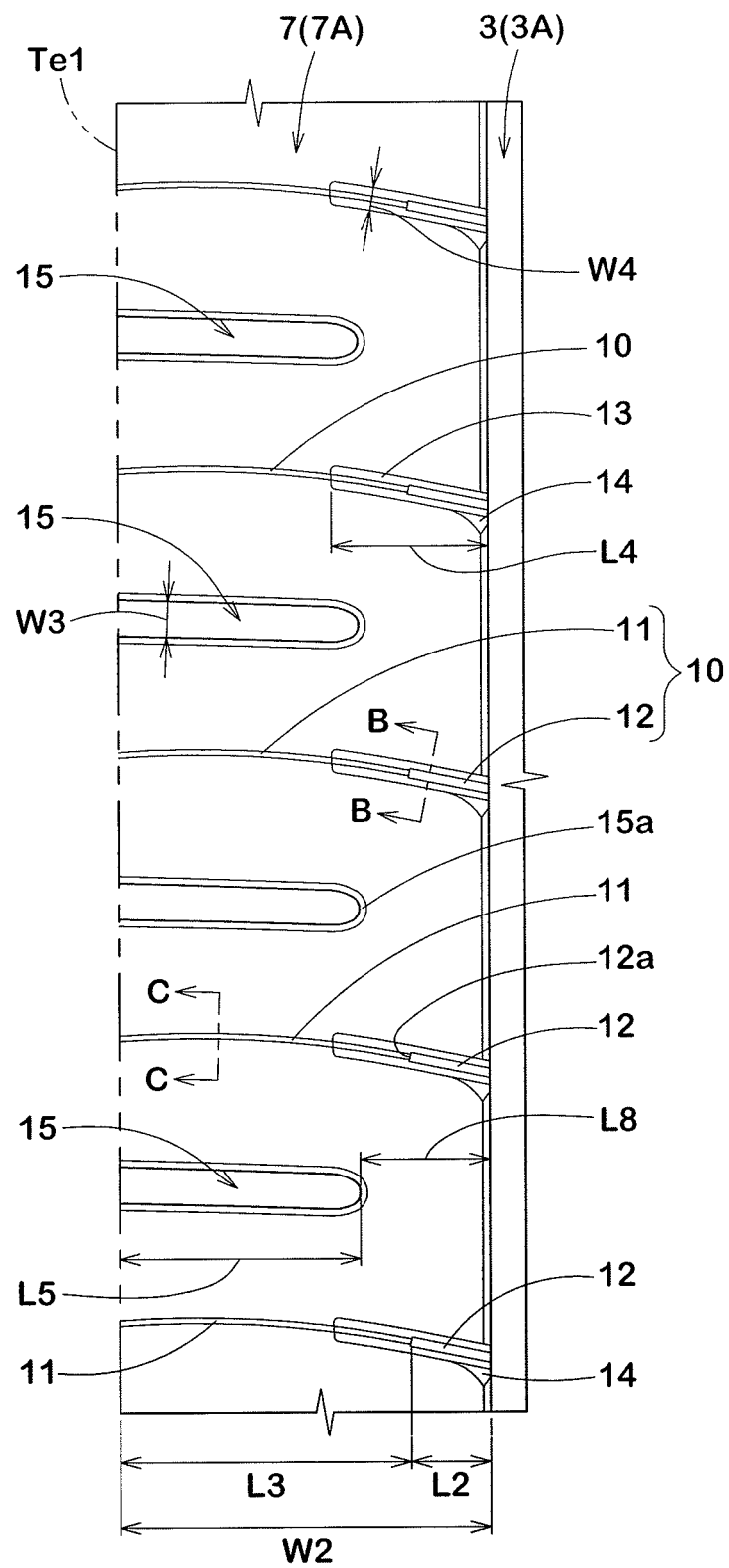
FIG. 3 is an enlarged view of an outer shoulder land region of FIG. 1.

FIG. 3 is an enlarged view of the outer shoulder land region 7A as an example of one of the shoulder land regions 7. As shown in FIG. 3, the shoulder land region 7A is provided with shoulder sipes 10 extending in the tyre axial direction. Note that, in this specification, "sipe" is a groove having a width of less than 1.5 mm. Further, in this specification, the shoulder sipes provided in the outer shoulder land region 7A may be referred to as outer shoulder sipes. The shoulder sipes 10 moderate deformation of the shoulder land region 7A at the time of contacting the ground, therefore, the uneven wear thereof is suppressed.

Each of the shoulder sipes 10 in this embodiment extends between the shoulder main groove 3A and the first tread edge (Te1). However, it is not limited to such an embodiment, and each of the shoulder sipes 10 may have one end or both ends terminating within the shoulder land region 7A.

Each of the shoulder sipes 10 includes a narrow sipe portion 11 and a wide sipe portion 12 having a larger width than that of the narrow sipe portion 11. The narrow sipe portion 11 has the width in the range of from 0.4 to 0.8 mm, for example. The width of the wide sipe portion 12 is preferably in the range of from 1.50 to 1.80 times, more preferably in the range of from 1.60 to 1.70 times the width of the narrow sipe portion 11, and specifically, preferably in the range of from 0.8 to 1.2 mm, for example.

It is possible that the wide sipe portion 12 moderates rigidity of the surrounding land part thereof more than the narrow sipe portion 11. Thereby, it is easy for the land part around the wide sipe portion 12 to follow the road surface even in an early stage of cornering in which a ground contacting load is not sufficiently increased, for example, therefore, it is possible that excellent initial responsiveness is obtained.

The wide sipe portion 12 of the present invention is arranged on a side of the shoulder main groove 3A. A larger ground contacting load tends to be applied to a part of the shoulder land region 7A on a side of the shoulder main groove 3A than a part thereof on a side of the tread edge (Te1) at the early stage of cornering. Therefore, by providing the wide sipe portions 12 in this region, the initial responsiveness is remarkably improved.

Further, the land parts around the narrow sipe portions 11 are located closer to the tread edge (Te1) than the wide sipe portions 12, therefore, they provide higher rigidity than the land parts around the wide sipe portions 12, thereby, in the middle stage of cornering in which sufficient ground contacting load is applied to the tyre, for example, large cornering force is exerted, therefore, it is possible that the steering stability is improved eventually.

It is preferred that each of the wide sipe portions 12 is connected with the shoulder main groove 3A, for example. It is preferred that a length L2 in the tyre axial direction of each of the wide sipe portions 12 is in the range of from 0.15 to 0.30 times a width W2 of the shoulder land region 7A, for example. It is possible that the wide sipe portions 12 configured as such improve uneven wear resistance performance and the steering stability in a good balance.

It is preferred that each of the narrow sipe portions 11 is connected with the first tread edge (Te1), for example. Further, it is preferred that a length L3 in the tyre axial direction of each of the narrow sipe portions 11 is larger than the length L2 in the tyre axial direction of each of the wide sipe portions 12. Specifically, it is preferred that the length L3 of each of the narrow sipe portions 11 is in the range of from 3.0 to 4.5 times the length L2 of each of the wide sipe portions 12, for example.

Figure 4A:
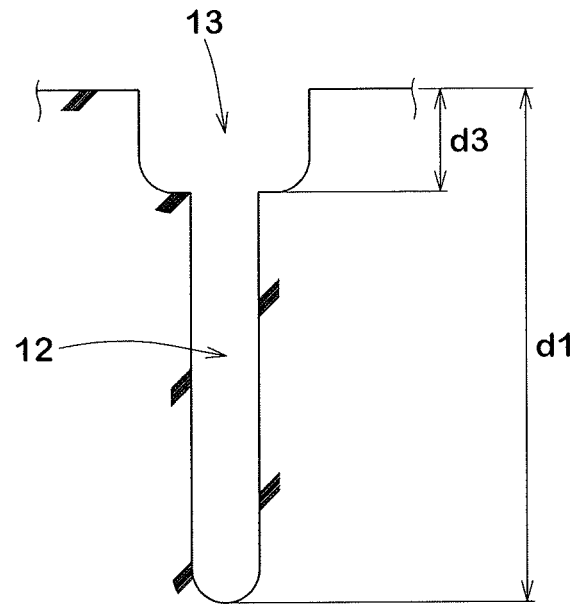
FIG. 4A is a cross-sectional view taken along B-B line of FIG. 3.
Figure 4B:
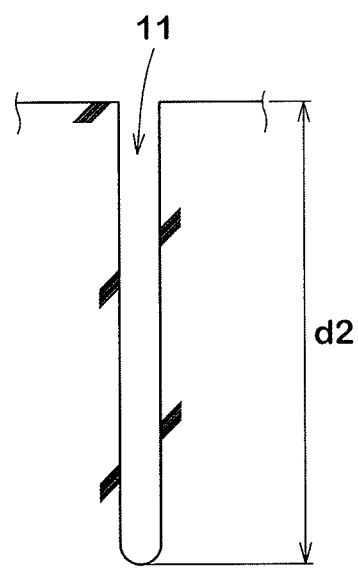
FIG. 4B is a cross-sectional view taken along C-C line of FIG. 3.

FIG. 4A is a cross-sectional view of one of the wide sipe portions 12 taken along B-B line of FIG. 3. FIG. 4B shows a cross-sectional view of one of the narrow sipe portions 11 taken along c-c line of FIG. 3. As shown in FIGS. 4A and 4B, it is preferred that a depth (d1) of the wide sipe portion 12 is larger than a depth (d2) of the narrow sipe portion 11. Specifically, the depth (d1) of the wide sipe portion 12 is preferably not less than 1.03 times, more preferably not less than 1.06 times, and preferably not more than 1.15 times, more preferably not more than 1.12 times the depth (d2) of the narrow sipe portion 11. Note that the depths (d1) and (d2) each correspond to a distance along a depth direction of the sipe between a ground contacting surface of the land region and a bottom of the sipe, for example.

As shown in FIGS. 3 and 4A, it is preferred that the shoulder land region 7A is provided with narrow groove portions 13 each having a groove width of not less than 1.5 mm and a groove depth of not more than 2.0 mm, and that the wide sipe portion 12 extends inwardly in a tyre radial direction from a groove bottom of each of the narrow groove portions 13. A depth (d3) of each of the narrow groove portions 13 is in the range of from 1.0 to 2.0 mm, for example. It is possible that the narrow groove portions 13 and the wide sipe portions 12 configured as such further improve the uneven wear resistance performance.

It is preferred that each of the narrow groove portions extends outwardly in the tyre axial direction from the shoulder main groove 3A and terminates between an outer end in the tyre axial direction of a respective one of the wide sipe portions 12 and the first tread edge (Te1), for example. It is preferred that a length L4 in the tyre axial direction of each of the narrow groove portions 13 is in the range of from 1.5 to 2.5 times the length L2 in the tyre axial direction of each of the wide sipe portions 12, for example.

In each set of one of the outer shoulder sipes 10 and a respective one of the narrow groove portions 13, between the outer end of the wide sipe portion 12 and an outer end of the narrow groove portion 13, it is preferred that the narrow sipe portion 11 extends inwardly in the tyre radial direction from a groove bottom of the narrow groove portion 13. Further, in a region between the outer end of the narrow groove portion 13 and the first tread edge (Te1), as shown in FIG. 4B, the narrow sipe portion 11 extends with a constant width between a bottom thereof and the ground contacting surface.

As shown in FIG. 3, it is preferred that, in a connecting portion of each of the narrow groove portions 13 with the shoulder main groove 3A, a portion between at least one of groove walls and a tread ground contacting surface is chamfered so that the groove width thereof gradually increases toward the shoulder main groove 3A. In each of the narrow groove portions 13 in this embodiment, only one of the groove walls (the lower groove wall in FIG. 3) has a chamfered portion 14, for example. It is possible that the narrow groove portions 13 configured as such decrease air column resonance sound in the outer shoulder main groove 3A while improving the uneven wear resistance performance.

The shoulder land region 7A in this embodiment is provided with a plurality of the shoulder sipes 10 arranged at intervals in the tyre circumferential direction, and a shoulder lateral groove 15 is arranged between each pair of the shoulder sipes 10 adjacent to each other in the tyre circumferential direction. In this specification, the shoulder lateral grooves 15 provided in the outer shoulder land region 7A may be referred to as outer shoulder lateral grooves.

Each of the shoulder lateral grooves 15 extends inwardly in the tyre axial direction from the first tread edge (Te1) and terminates without being connected with the shoulder main groove 3A, for example. It is possible that the shoulder lateral grooves 15 configured as such improve the wet performance while maintaining the rigidity of the shoulder land region 7A.

It is preferred that inner ends (15a) in the tyre axial direction of the shoulder lateral grooves 15 are located on an outer side in the tyre axial direction of outer ends (12a) in the tyre axial direction of the wide sipe portions 12. A length L5 in the tyre axial direction of each of the shoulder lateral grooves 15 is preferably not less than 0.45 times, more preferably not less than 0.52 times, and preferably not more than 0.65 times, more preferably not more than 0.58 times the width W2 in the tyre axial direction of the shoulder land region 7A, for example.

In order to exert sufficient drainage performance, it is preferred that a groove width W3 of each of the shoulder lateral grooves 15 is in the range of from 1.5 to 2.5 times a groove width W4 of each of the narrow groove portions 13, for example.

Figure 5:
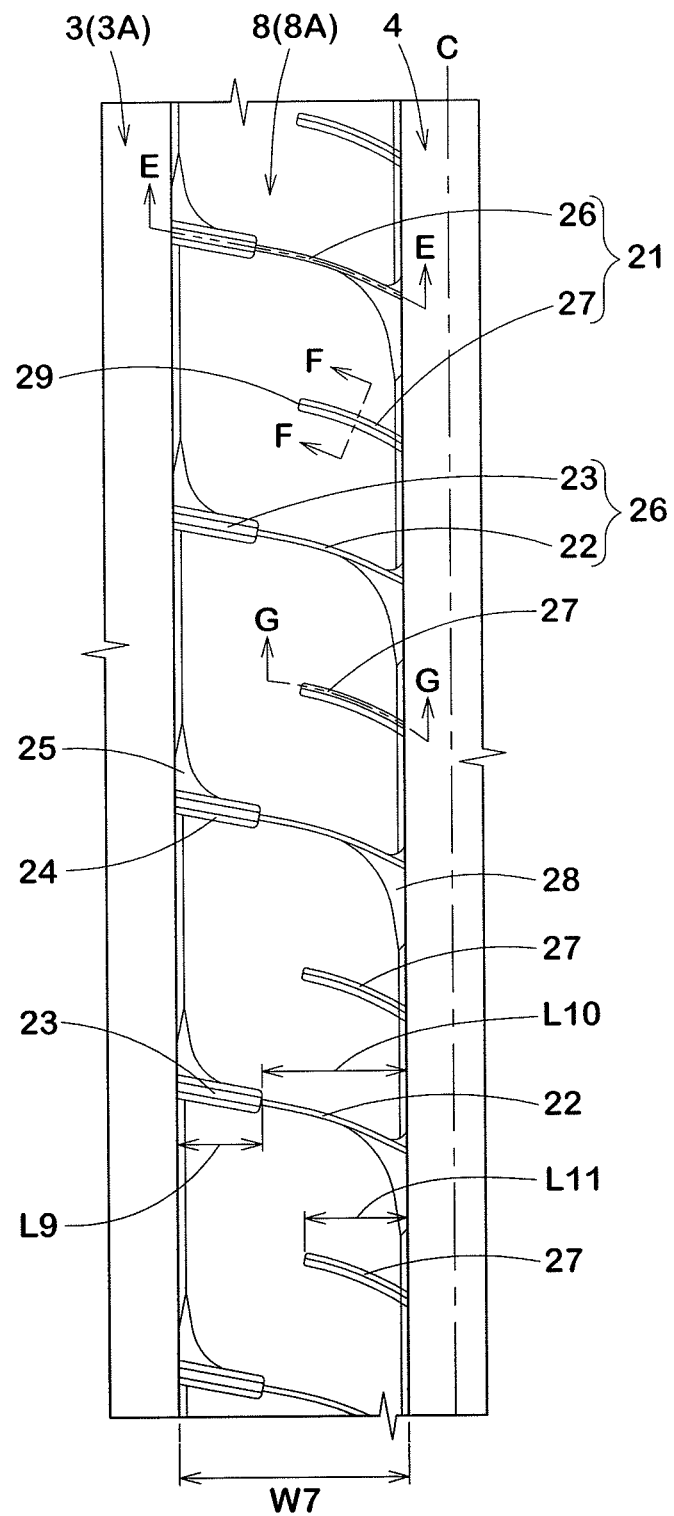
FIG. 5 is an enlarged view of an outer crown land region of FIG. 1.

FIG. 5 is an enlarged view of the outer crown land region 8A as an example of one of the crown land regions 8. As shown in FIG. 5, the outer crown land region 8A is provided with crown sipes 21 each extending in the tyre axial direction with a width of less than 1.5 mm, for example. Note that, in this specification, the crown sipes 21 provided in the outer crown land region 8A may be referred to as outer crown sipes.

The crown sipes 21 include first crown sipes 26 each extending so as to cross the outer crown land region 8A. The first crown sipes 26 moderate deformation of the outer crown land region 8A at the time of contacting the ground, therefore, the uneven wear thereof is suppressed. Note that the first crown sipe 26 may be referred to as first outer crown sipes.

Each of the first crown sipes 26 includes a narrow sipe portion 22 and a wide sipe portion 23 having a larger width than that of the narrow sipe portion 22. The wide sipe portion 23 is connected with the outer shoulder main groove 3A. Note that the dimensions of the narrow sipe portion 11 and the wide sipe portion 12 of each of the outer shoulder sipes 10 described above can be applied to the narrow sipe portion 22 and the wide sipe portion 23 of each of the first crown sipes 26.

It is possible that the wide sipe portion 23 moderates the rigidity of the surrounding land part thereof more than the narrow sipe portion 22. On the other hand, in the crown land region 8A, variation of the ground contacting load during running is larger in a part on a side of the shoulder main groove 3A than in a part on a side of the crown main groove 4, therefore, the uneven wear is more likely to occur due to minute slippage of the ground contacting surface. In this embodiment, by providing the wide sipe portions 23 in this region, it is made easy for the surrounding land parts to follow the road surface, therefore, it is possible that the minute slippage is suppressed, thereby, it is possible that the uneven wear of the crown land region 84 is eventually further suppressed.

Further, in the outer crown land region 8A, the land parts around the wide sipe portions 23 are likely to follow the road surface even in a state of early stage of cornering in which the ground contacting load is not sufficiently increased, for example, therefore, it is possible that the initial responsiveness is increased as well.

Furthermore, in the outer crown land region 8A, the land parts around the narrow sipe portions 22 provide higher rigidity than the land parts around the wide sipe portions 23, therefore, large cornering force is exerted, thereby, it is possible that the steering stability is eventually improved.

Similar to the wide sipe portions 12 of the outer shoulder Sipes 10, it is preferred that each of the wide sipe portions 23 extends inwardly in the tyre radial direction from a groove bottom of a respective one of narrow groove portions 24. The dimensions of the narrow groove portions 13 provided in the outer shoulder land region 7A can be applied to the narrow groove portions 24 provided in the crown land region 8A, for example.

It is preferred that, in a connecting portion of each of the narrow groove portions 24 with the outer shoulder main groove 3A, a portion between at least one of groove walls and the tread ground contacting surface is chamfered so that a groove width thereof gradually increases toward the outer shoulder main groove 3A. In this embodiment, as shown in FIG. 1, each of the narrow groove portions 13 provided in the outer shoulder land region 7A has the chamfered portion 14 in the groove wall on one side (the lower side in FIG. 1) in the tyre circumferential direction, and each of the narrow groove portions 24 provided in the outer crown land region 8A has a chamfered portion 25 in a groove wall thereof on the other side (the upper side in FIG. 1) in the tyre circumferential direction. Each of the chamfered portions 25 provided in the outer crown land region 8A has a larger chamfer length in the tyre circumferential direction than that of each of the chamfered portions 14 provided in the outer shoulder land region 7A. It is possible that such an arrangement of the narrow groove portions 24 improves the uneven wear resistance performance and suppresses generation of a stationary wave in the outer shoulder main groove 3A, therefore, it is possible that the air column resonance sound is eventually decreased.

As shown in FIG. 5, it is preferred that a length L9 in the tyre axial direction of each of the wide sipe portions 23 is in the range of from 0.30 to 0.40 times a width W7 of the outer crown land region 8A, for example.

Each of the narrow sipe portions 22 is connected with the crown main groove 4, for example. It is preferred that a length L10 in the tyre axial direction of each of the narrow sipe portions 22 is greater than the length L9 in the tyre axial direction of each of the wide sipe portions 23. The length L10 of each of the narrow sipe portions 22 is in the range of from 1.60 to 1.80 times the length L9 of each of the wide sipe portions 23, for example. With the wide sipe portions 23 and the narrow sipe portions 22 configured as such, it is possible that large cornering force is obtained while excellent initial responsiveness is exerted.

It is preferred that, in a connecting portion of each of the narrow sipe portions 22 with the crown main groove 4, a portion between at least one of sipe walls and the tread ground contacting surface is chamfered so that a width thereof gradually increases toward the crown main groove 4. In this embodiment, a chamfered portion 28 is provided on the sipe wall on the opposite side (lower side in FIG. 5) to the chamfered portion 25 provided on the groove wall of each of the narrow groove portions 24. The chamfered portions 28 configured as such decrease the air column resonance sound of the crown main groove 4, therefore, it is possible that noise performance is eventually improved.

Figure 6A:
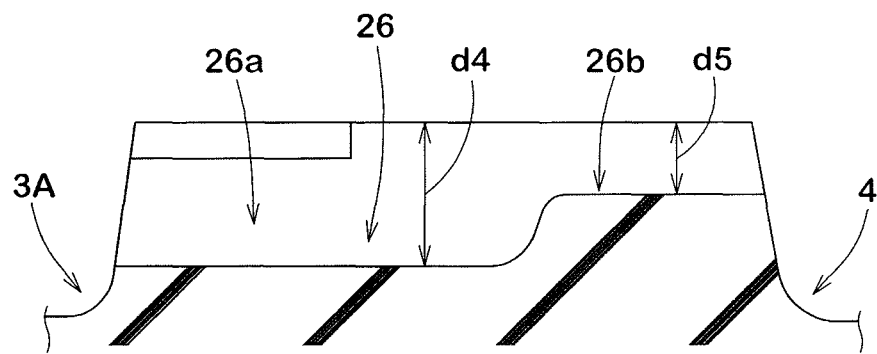
FIG. 6A is a cross-sectional view taken along E-E line of FIG. 5.

FIG. 6A is a cross-sectional view of one of the first crown sipes 26 taken along E-E line of FIG. 5. As shown in FIG. 6A, each of the first crown sipes 26 includes a first sipe portion (26a) arranged on a side of the outer shoulder main groove 3A and a second sipe portion (26b) arranged on a side of the crown main groove 4, for example. The second sipe portion (26b) has a depth smaller than that of the first sipe portion (26a), for example. A depth (d5) of the second sipe portion (26b) is in the range of from 0.45 to 0.55 times a depth (d4) of the first sipe portion (26a), for example. The first crown sipes 26 configured as such maintain the rigidity of a portion of the outer crown land region 8A on a side of the tyre equator (c) while improving the initial responsiveness, therefore, it is possible that further excellent steering stability is exerted.

As shown in FIG. 1, in each pair of one of the first crown sipes 26 and one of the outer shoulder sipes 10 adjacent to each other in the tyre axial direction, it is preferred that a displacement amount in the tyre circumferential direction between the first crown sipe 26 and the outer shoulder sipe 10 at the outer shoulder main groove 3A is not more than 1.0 mm. The outer shoulder sipe 10 in this embodiment is arranged so as to be continuous with the first crown sipe 26 with the outer shoulder main groove 3A therebetween, and in a preferred embodiment, the outer shoulder sipe 10 includes a portion linearly continuous with the first crown sipe 26 with the shoulder main groove 3A therebetween. Such an arrangement of the sipes makes it further easier for the surrounding land parts to follow the road surface, therefore, it is possible that the initial responsiveness is further improved.

As shown in FIG. 5, the crown sipes 21 provided in the outer crown land region 8A include second crown sipes 27. Each of the second crown sipes 27 extends from the crown main groove 4 toward the outer shoulder main groove 3A and has a terminating end 29 terminating within the outer crown land region 8A, for example. Note that the second crown sipes 27 may be referred to as second outer crown sipes.

A length L11 in the tyre axial direction of each of the second crown Sipes 27 is in the range of from 0.35 to 0.55 times, preferably in the range of from 0.42 to 0.48 times the width W7 in the tyre axial direction of the outer crown land region 8A, for example. Further, it is preferred that the terminating ends 29 of the second crown Sipes 27 are located closer to the crown main groove 4 than end portions on the side of the crown main groove 4 of the wide sipe portions 23 of the first crown sipes 26. The second crown sipes 27 configured as such suppress excessive decrease in the rigidity of the outer crown land region 8A, therefore, it is possible that large cornering force is provided.

Figure 6B:
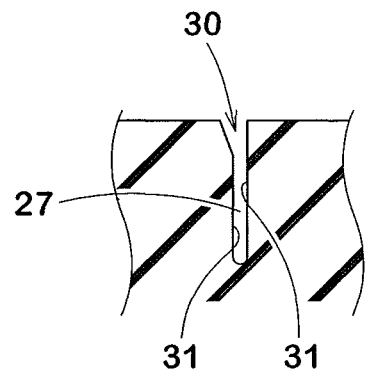
FIG. 6B is a cross-sectional view taken along F-F line of FIG. 5.

FIG. 6B is a cross-sectional view of one of the second crown sipes 27 taken along F-F line orthogonal thereto of FIG. 5. As shown in FIG. 6B, it is preferred that each of the second crown sipes 27 has an opening portion 30 having a width increasing outwardly in the tyre radial direction, for example. In this embodiment, one of sipe walls 31 on one side in the tyre circumferential direction of each of the second crown sipes 27 is inclined, whereby the opening portion 30 is formed. The sipe walls 31 on both sides may be inclined in each of the second crown sipes 27, for example. Further, the second crown sipes 27 may be respectively provided at the groove bottoms of the narrow groove portions described above, for example.

Figure 6C:
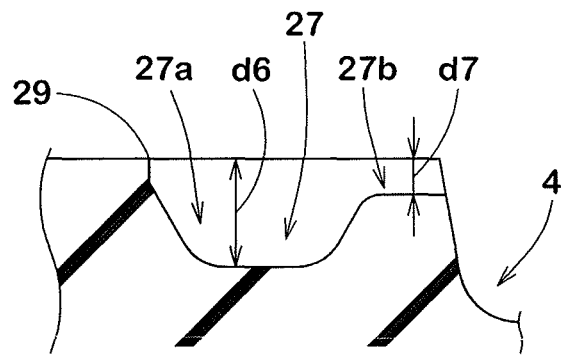
FIG. 6C is a cross-sectional view taken along G-G line of FIG. 5.

FIG. 6C is a cross-sectional view taken along G-G line along one of the second crown sipes 27 of FIG. 5. As shown in FIG. 6C, it is preferred that each of the second crown sipes 27 includes a first sipe portion (27a) located on a side of the terminating end 29 and a second sipe portion (27b) located on the side of the crown main groove 4. The second sipe portion (27b) has a smaller depth than the first sipe portion (27a), for example. It is preferred that a depth (d7) of the second sipe portion (27b) is in the range of from 0.45 to 0.55 times a depth (d6) of the first sipe portion (27a), for example. Each of the second crown sipes 27 configured as such suppresses a portion thereof on the side of the crown main groove 4 from being excessively opened, therefore, it is possible that the uneven wear resistance performance and the steering stability are improved.

Figure 7:
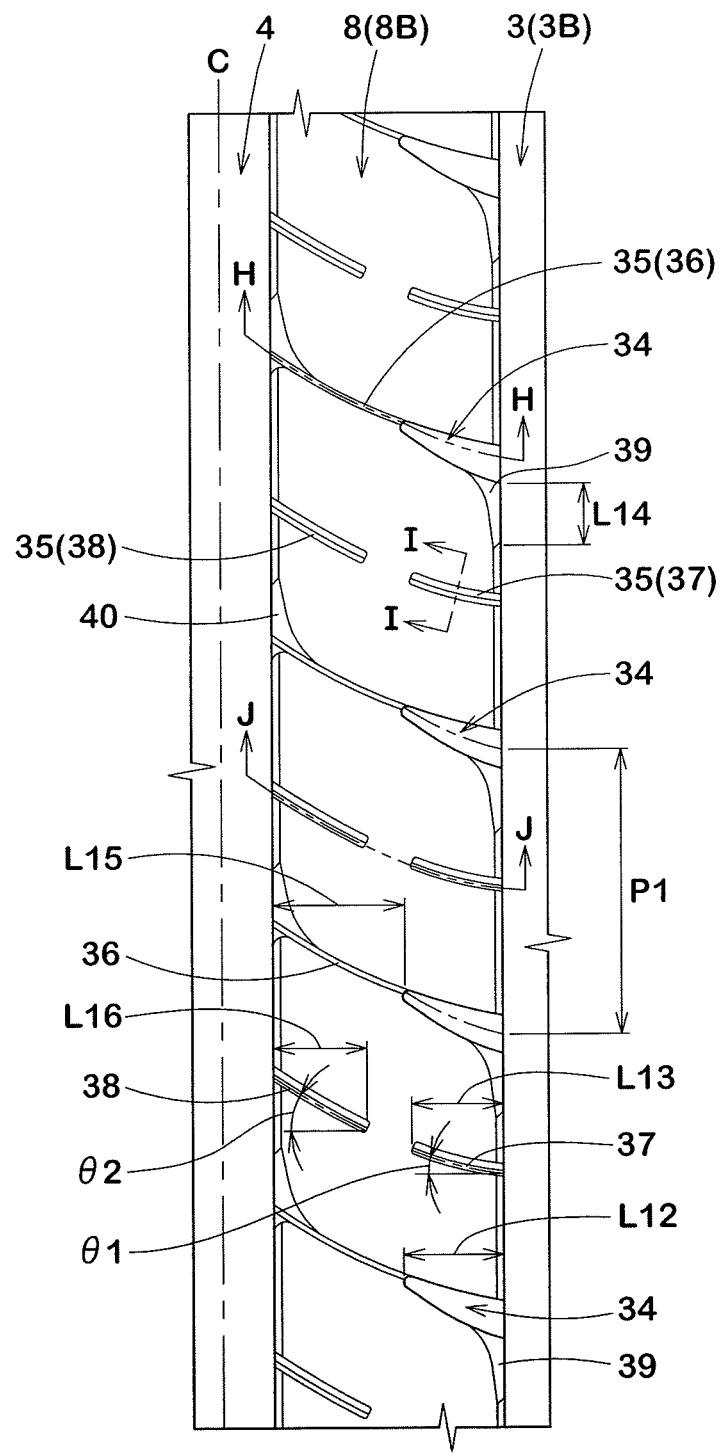
FIG. 7 is an enlarged view of an inner crown land region of FIG. 1.

FIG. 7 is an enlarged view of the inner crown land region 8B in this embodiment as another example of the crown land region 8. As shown in FIG. 7, the inner crown land region 8B is provided with a plurality of crown lateral grooves 34 each having a width of not less than 1.5 mm and a plurality of inner crown sipes 35 each having a width of less than 1.5 mm.

The crown lateral grooves 34 cooperate with the inner shoulder main grooves 3B to improve the drainage performance in the vicinity of the inner crown land region 8B, for example.

The inner crown sipes 35 include first inner crown sipes 36, second inner crown sipes 37, and third inner crown sipes 38, for example. Each of the first inner crown sipes 36 extends between an inner end of a respective one of the crown lateral grooves 34 and the crown main groove 4. Each of the second inner crown sipes 37 extends from the inner shoulder main groove 3B toward the crown main groove 4 and has an inner end terminating within the inner crown land region 8B. Each of the third inner crown sipes 38 extends from the crown main groove 4 toward the inner shoulder main groove 3B and has an outer end terminating within the inner crown land region 8B. These sipes provide frictional force on a wet road surface by their respective edges. Further, relatively large ground contact pressure is applied to the inner crown land region 8B, therefore, the wet performance is remarkably improved by the effect of these grooves and the sipes.

Each of the first inner crown sipes 36, the second inner crown sipes 37, and the third inner crown sipes 38 has a width of less than 1.5 mm, therefore, almost no pumping noise is generated at the time of contacting the ground. Further, the first inner crown sipes 36, the second inner crown sipes 37, and the third inner crown sipes 38 moderately moderate the rigidity of the inner crown land region 8B, therefore, it is possible that impact sound when the land region contacts the ground is decreased. Thereby, it is possible that excellent noise performance is obtained.

Each of the crown lateral grooves 34 is configured to have a length L12 in the tyre axial direction larger than a length L13 in the tyre axial direction of each of the second inner crown sipes 37. Thereby, frequency bands of the impact sound when the edges of the crown lateral grooves 34 contact the ground and the impact sound when the edges of the second inner crown sipes 37 contact the ground are dispersed, therefore, the noise performance is improved eventually. Further, the crown lateral grooves 34 having greater lengths than the sipes can be expected to have high drainage performance.

In order to further increase the effects described above, the length L12 of each of the crown lateral grooves 34 is preferably not less than 105%, more preferably not less than 108%, and preferably not more than 120%, more preferably not more than 114% of the length L13 in the tyre axial direction of each of the second inner crown sipes 37.

The crown lateral grooves 34 are inclined with respect to the tyre axial direction, for example. It is preferred that a groove width of each of the crown lateral grooves 34 gradually decreases toward the crown main groove 4, for example.

It is preferred that, in a connecting portion of each of the crown lateral grooves 34 with the inner shoulder main groove 3B, a portion between at least one of groove walls and the tread ground contacting surface is chamfered so that the groove width thereof gradually increases toward the inner shoulder main groove 3B, for example. In this embodiment, a chamfered portion 39 is provided on one of the groove walls of each of the crown lateral grooves 34. In a preferred embodiment, the chamfered portion 39 of each of the crown lateral grooves 34 is provided on the same side in the tyre circumferential direction as the chamfered portion 28 (shown in FIG. 5) provided in the narrow sipe portion 22 of each of the first outer crown sipes 26. It is possible that the crown lateral grooves 34 configured as such suppress the generation of the stationary wave in the inner shoulder main groove 3B while improving the uneven wear resistance performance, therefore, it is possible that the air column resonance sound is eventually decreased.

It is preferred that a length L14 in the tyre circumferential direction of the chamfered portion 39 of each of the crown lateral grooves 34 is in the range of from 0.15 to 0.30 times one pitch length P1 of the crown lateral grooves 34, for example. Thereby, the wet performance and the noise performance are improved in a good balance.

The first inner crown sipes 36 are inclined in the same direction as the crown lateral grooves 34, for example. In this embodiment, one of edges of each of the first inner crown sipes 36 extends so as to be smoothly continuous with one of the edges on the same side of a respective one of the crown lateral grooves 34.

It is preferred that, in the connecting portion of each of the first inner crown sipes 36 with the crown main groove 4, a portion between at least one of the ripe walls and the tread ground contacting surface is chamfered so that the width thereof gradually increases toward the crown main groove 4. It is preferred that each of the first inner crown sipes 36 has a chamfered portion 40 on the opposite side in the tyre circumferential direction to the chamfered portion 39 of each of the crown lateral grooves 34, for example. Thereby, the frequency bands of the impact sound generated when the edge on one side of each of the first inner crown sipes 36 and the edge on one side of each of the crown lateral grooves 34 come into contact with the road surface and the impact sound generated when the edge on the other side of each of the first inner crown sipes 36 and the edge on the other side of each of the crown lateral grooves 34 come into contact with the road surface become more likely to be dispersed, therefore, the noise performance is improved.

As shown in FIG. 1, it is preferred that each of the first outer crown sipes 26 provided in the outer crown land region 8A is arranged at a position so as to be smoothly continuous with a respective one of the first inner crown sipes 36 with the crown main groove 4 therebetween. Thereby, it becomes easier for the land parts around the sipes to follow the road surface, therefore, the initial responsiveness is improved.

Figure 8A:
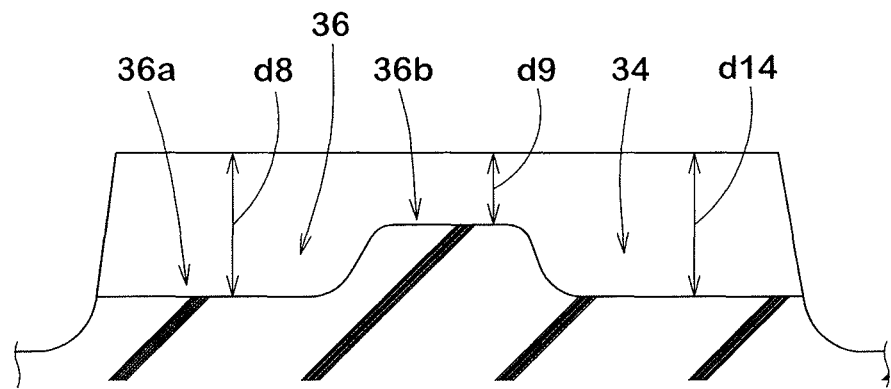
FIG. 8A is a cross-sectional view taken along H-H line of FIG. 7.

FIG. 8A is a cross-sectional view of one of the crown lateral grooves 34 and one of the first inner crown sipes 36 taken along H-H line of FIG. 7. As shown in FIG. 8A, it is preferred that each of the first inner crown sipes 36 includes a first sipe portion (36a) arranged on a side of the crown main groove 4 and a second sipe portion (36b) arranged on a side of a respective one of the crown lateral grooves 34.

The first sipe portion (36a) has a depth (d8) same as a depth (d14) of each of the crown lateral grooves 34, for example. It is preferred that the second sipe portion (36b) has a depth (d9) smaller than that of the first sipe portion (36a), for example. The depth (d9) of the second sipe portion (36b) is in the range of from 0.40 to 0.60 times the depth d8 of the first sipe portion (36a), for example. The first inner crown sipes 36 configured as such make it easy for a part of the inner crown land region 8B on the side of the crown main groove 4 to deform moderately, therefore, it is possible that the generation of the stationary wave in the crown main groove 4 is suppressed, thereby, it is possible that the air column resonance sound of the crown main groove 4 is decreased.

As shown in FIG. 7, each of the second inner crown sipes and the third inner crown sipes 38 terminates without crossing a center position in the tyre axial direction of the inner crown land region 8B. Each of the second inner crown sipes 37 and the third inner crown sipes 38 in this embodiment has a smaller length in the tyre axial direction than that of each of the first inner crown sipes 36, for example. It is preferred that the length L13 in the tyre axial direction of each of the second inner crown sipes 37 and a length L16 in the tyre axial direction of each of the third inner crown sipes 38 is in the range of from 0.60 to 0.75 times a length L15 in the tyre axial direction of each of the first inner crown sipes 36, respectively.

It is preferred that the second inner crown sipes 37 and the third inner crown sipes 38 are inclined in the same direction as the first inner crown sipes 36 with respect to the tyre axial direction, for example. It is preferred that an angle θ1 of each of the second inner crown sipes 37 with respect to the tyre axial direction is in the range of from 0 to 20 degrees, for example. It is preferred that an angle θ2 of each of the third inner crown sipes 38 with respect to the tyre axial direction is larger than the angle θ1 and in the range of from 20 to 40 degrees, for example. The second inner crown sipes 37 and the third inner crown sipes 38 configured as such are useful for making the impact sound generated when the edges of each of the sipes contact the road surface into white noise.

Figure 8B:
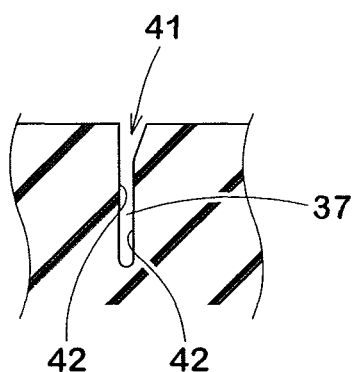
FIG. 8B is a cross-sectional view taken along I-I line of FIG. 7.

FIG. 8B is a cross-sectional view of one of the second inner crown sipes 37 taken along I-I line perpendicular thereto of FIG. 7. As shown in FIG. 8B, it is preferred that each of the second inner crown sipes 37 has an opening portion 41 having a width increasing outwardly in the tyre radial direction, for example. In this embodiment, one of sipe walls 42 on one side in the tyre circumferential direction of each of the second inner crown sipes 37 is inclined, whereby the opening portion 41 is formed. The sipe walls 42 on both sides may be inclined in each of the second inner crown sipes 37, for example. Further, the second inner crown sipes 37 may be respectively provided at the groove bottoms of the narrow groove portions described above, for example.

As shown in FIG. 1, it is preferred that, in each of the second outer crown sipes 27 in this embodiment, the inclined sipe wall 31 is arranged on one side in the tyre circumferential direction (the lower side in FIG. 1) and in each of the second inner crown sipes 37 in this embodiment, the inclined sipe wall 42 is arranged on the other side (the upper side in FIG. 1) in the tyre circumferential direction.

Figure 8C:
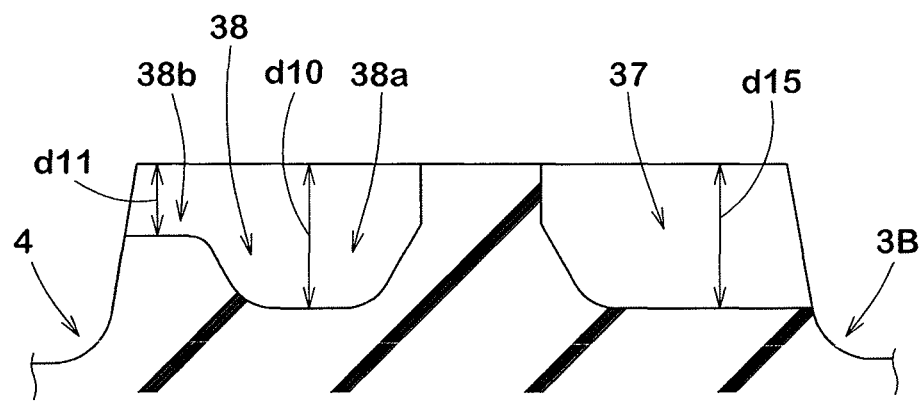
FIG. 8C is a cross-sectional view taken along J-J line of FIG. 7.

FIG. 8c is a cross-sectional view of one of the second inner crown sipes 37 and one of the third inner crown sipes 38 taken along J-J line of FIG. 7. As shown in FIG. 8c, each of the second inner crown sipes 37 extends from the inner shoulder main groove 3B at a constant depth until the depth gradually decreases near an inner end thereof. Each of the third inner crown sipes 38 includes a first sipe portion (38a) arranged on a side of a respective one of the second inner crown sipes 37 and a second sipe portion (38b) on a side of the crown main groove 4. The first sipe portion (38a) has a depth (d10) same as a depth (d15) of each of the second inner crown sipes 37, for example. The second sipe portion (38b) has a depth (d11) smaller than that of the first sipe portion (38a), for example. It is preferred that the depth (d11) of the second sipe portion (38b) is in the range of from 0.45 to 0.55 times the depth (d10) of the first sipe portion (38a), for example. It is possible that the second inner crown sipes 37 and the third inner crown sipes 38 configured as such, in combination with the first inner crown sipes 36 described above, improve the wet performance and the noise performance in a good balance.

As shown in FIG. 1, it is preferred that each of the second outer crown sipes 27 is arranged at a position so as to be smoothly continuous with a respective one of the third inner crown sipes 38 with the crown main groove 4 therebetween. Thereby, it becomes easier for the land parts around the sipes to follow the road surface, therefore, the initial responsiveness is improved.

As shown in FIG. 2, it is preferred that both of an inner edge (43a) arranged on the side of the crown main groove 4 and an outer edge (43b) arranged on the side of the inner shoulder main groove 38 of the inner crown land region 8B are chamfered. Similarly, it is preferred that both of the inner edge (43a) arranged on the side of the crown main groove 4 and the outer edge (43b) arranged on the side of the outer shoulder main groove 3A of the outer crown land region 8A are chamfered. It is possible that each of the land regions configured as such moderates the impact sound generated when the edges come into contact with the road surface.

It is preferred that, in each of the inner crown land region 8B and the outer crown land region 8A, a radius of curvature R1 of the tread ground contacting surface is not more than 560 mm. Specifically, it is preferred that the radius of curvature R1 is in the range of from 400 to 500 mm. Thereby, the ground contact pressure applied to the inner crown land region 8B and the outer crown land region 8A is increased while the ground contact pressure applied to the outer shoulder land region 7A and the inner shoulder land region 7B is moderated, therefore, it is possible that sound generated when each of the shoulder land regions 7A and 7B rotates.

Figure 9:
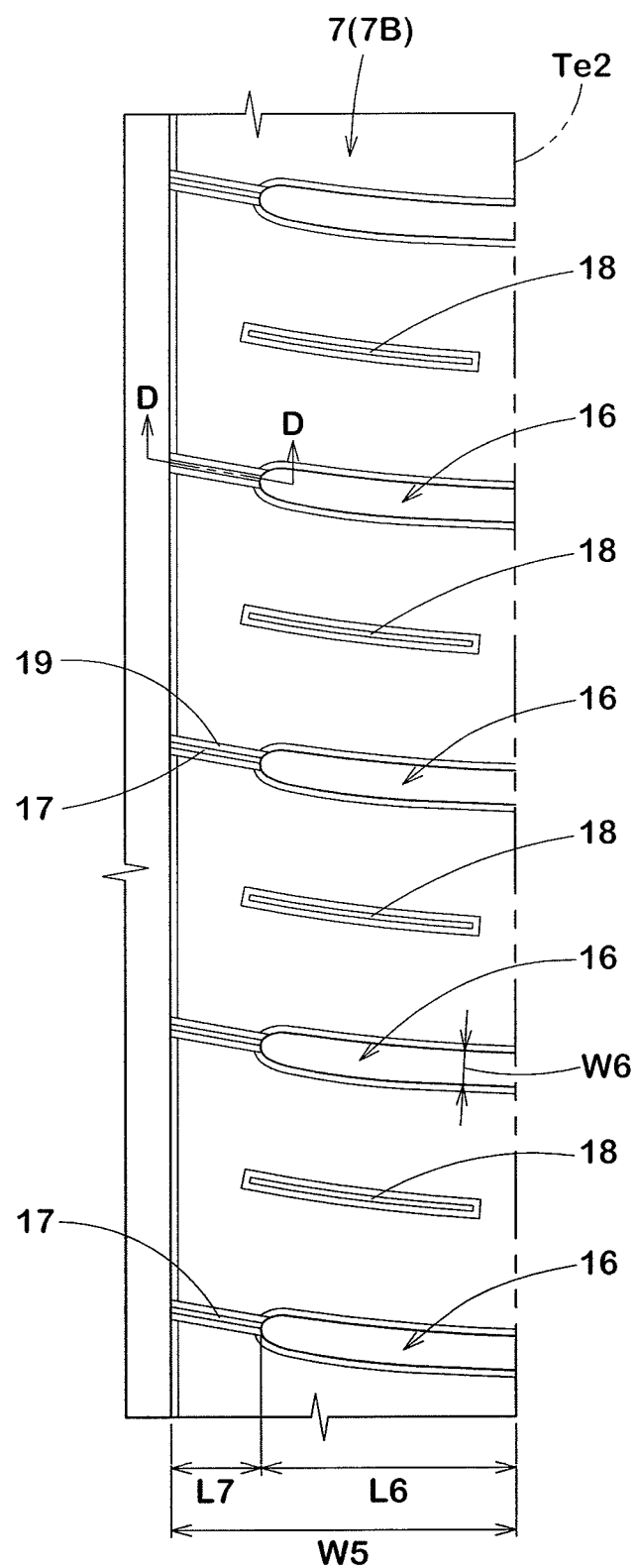
FIG. 9 is an enlarged view of an inner shoulder land region of FIG. 1.

FIG. 9 is an enlarged view of the inner shoulder land region 7B as another example of the shoulder land region 7. As shown in FIG. 9, the inner shoulder land region 7B is provided with a plurality of inner shoulder lateral grooves 16, for example. Each of the inner shoulder lateral grooves 16 extends inwardly in the tyre axial direction from the second tread edge (Te2) and terminates without being connected with the inner shoulder main groove 3B, for example.

A length L6 in the tyre axial direction of each of the inner shoulder lateral grooves 16 is preferably not less than 0.60 times, more preferably not less than 0.65 times, and preferably not more than 0.76 times, more preferably not more than 0.71 times a width W5 in the tyre axial direction of the inner shoulder land region 7B. It is possible that the inner shoulder lateral grooves 16 configured as such improve the steering stability and the wet performance in a good balance.

It is preferred that a distance L7 in the tyre axial direction between an inner end of each of the inner shoulder lateral grooves 16 and the inner shoulder main groove 3B is smaller than a distance L8 (shown in FIG. 3) between an inner end of each of the outer shoulder lateral grooves 15 and the outer shoulder main groove 3A, for example.

Each of the inner shoulder lateral grooves 16 has a groove width W6 larger than 2 mm, for example. It is preferred that the groove width W6 of each of the inner shoulder lateral grooves 16 is in the range of from 0.40 to 0.60 times the groove width (W1c) (shown in FIG. 1) of the inner shoulder main groove 3B, for example.

The inner shoulder land region 7B is provided with connecting sipes 17 each extending so as to connect between a respective one of the inner shoulder lateral grooves 16 and the inner shoulder main groove 3B and inner shoulder sipes 18 each arranged between a respective pair of the inner shoulder lateral grooves 16 adjacent to each other in the tyre circumferential direction.

Each of the connecting sipes 17 extends inwardly in the tyre radial direction from a groove bottom of a respective one of narrow groove portions 19 each having a groove width not less than 1.5 mm and a groove depth not more than 2.0 mm, for example. Each of the connecting sipes 17 has a width in the range of from 0.4 to 0.8 mm, for example. It is possible that dimensions of the narrow groove portions 13 provided in the outer shoulder land region 7A are applied to dimensions of the narrow groove portions 19, for example.

Figure 10:
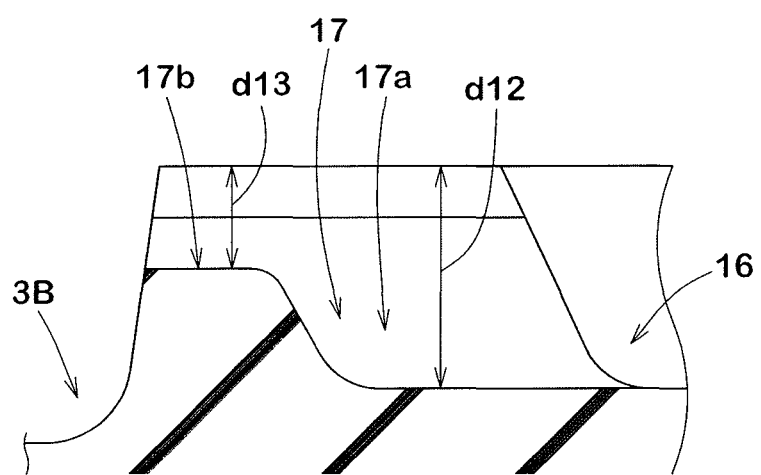
FIG. 10 is a cross-sectional view taken along D-D line of FIG. 9.

FIG. 10 is a cross-sectional view of one of the connecting sipes 17 taken along D-D line of FIG. 9. As shown in FIG. 10, each of the connecting sipes 17 includes a first sipe portion (17a) arranged on a side of a respective one of the inner shoulder lateral grooves 16 and a second sipe portion (17b) arranged on a side of the inner shoulder main groove 3B, for example. The second sipe portion (17b) has a depth smaller than that of the first sipe portion (17a), for example. It is preferred that a depth (d13) of the second sipe portion (17b) is in the range of from 0.35 to 0.55 times a depth (d12)

of the first sipe portion (17a). Each of the connecting sipes 17 configured as such suppresses a portion thereof on the side of the inner shoulder main groove 3B from being excessively opened while improving the initial responsiveness, therefore, it is possible that the uneven wear resistance performance is improved as well.

As shown in FIG. 9, the inner shoulder sipes 18 extend along the inner shoulder lateral grooves 16, for example. Both ends of each of the inner shoulder sipes 18 terminate within the inner shoulder land region 7B, for example. The inner shoulder sipes 18 configured as such make it easier for the land region to follow the road surface while suppressing excessive decrease in the rigidity of the land region, therefore, it is possible that excellent steering stability and the initial responsiveness are eventually exerted.

Similar to the connecting sipes 17 described above, each of the inner shoulder sipes 18 extends inwardly in the tyre radial direction from a groove bottom of a respective one of the narrow groove portions, for example.

As shown in FIG. 1, it is preferred that a land ratio (Lr1) of the region between the tyre equator (C) and the first tread edge (Te1) is larger than a land ratio (Lr2) of the region between the tyre equator (C) and the second tread edge (Te2). Specifically, it is preferred that the land ratio (Lr1) is in the range of from 1.05 to 1.10 times the land ratio (Lr2). Thereby, the response during steering is made linear, therefore, it is possible that excellent steering stability is exerted. In this specification, the term "land ratio" means a ratio Sb/Sa of a total area Sa of an imaginary ground contacting surface obtained by filling all the grooves and the sipes and the actual total ground contacting area Sb.

Figure 11:
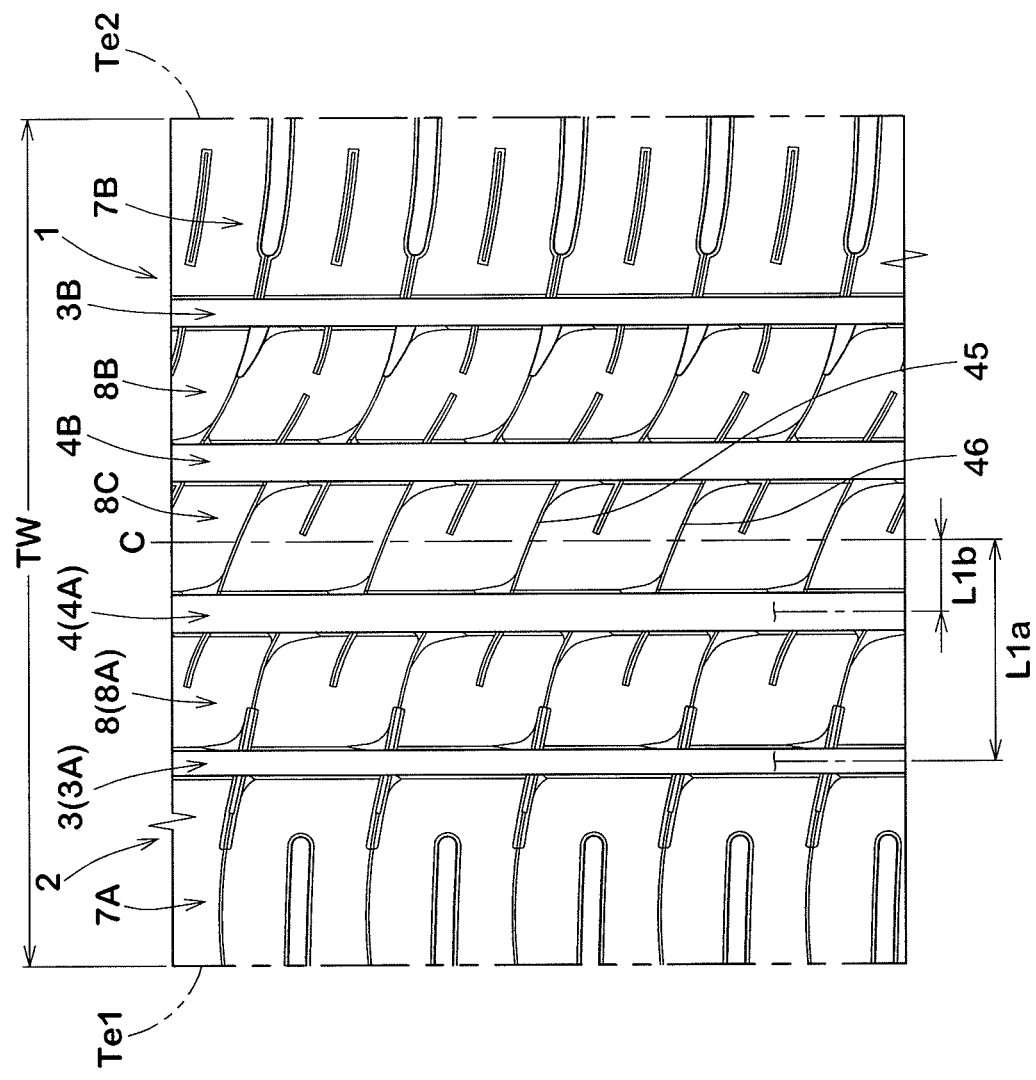
FIG. 11 is a development view of the tread portion of the tyre according to another embodiment of the present invention.

FIG. 11 is a development view of the tread portion 2 of the tyre 1 according to another embodiment of the present invention. As shown in FIG. 11, in this embodiment, an outer crown main groove 4A and an inner crown main groove 4B are provided on both sides of the tyre equator (c). The outer crown main groove 4A is provided between the tyre equator (C) and the outer shoulder main groove 3A. The inner crown main groove 4B is provided between the tyre equator (c) and the inner shoulder main groove 3B.

It is preferred that each of the shoulder main grooves 3 in this embodiment is formed such that a distance (Lla) between the groove center line thereof and the tyre equator (C) is in the range of from 0.20 to 0.30 times the tread width TW, for example. It is preferred that each of the crown main grooves 4 is formed such that a distance (L1b) from a groove center line thereof and the tyre equator (C) is in the range of from 0.05 to 0.15 times the tread width TW, for example.

By being provided with the main grooves described above, the tread portion 2 in this embodiment includes the outer shoulder land region 7A, the inner shoulder land region 7B, the outer crown land region 8A, the inner crown land region 8B, and a center crown land region 8c. It is possible that the above-described configurations are applied to the outer shoulder land region 7A, the inner shoulder land region 7B, the outer crown land region 8A, and the inner crown land region 8B.

The center crown land region 8C is defined between the outer crown main groove 4A and the inner crown main groove 4B. The center crown land region 8C in this embodiment is provided with first center crown sipes 45 and second center crown sipes 46, for example. Each of the first center crown sipes 45 extends so as to cross the center crown land region 8C, for example. Each of the second center crown sipes 46 extends from the inner crown main groove 4B toward the tyre equator (C) and terminates before reaching the tyre equator (C), for example.

While detailed description has been made of embodiments of the present invention, the present invention can be embodied in various forms without being limited to the illustrated embodiments.

WORKING EXAMPLES (EXAMPLES)

Figure 12:
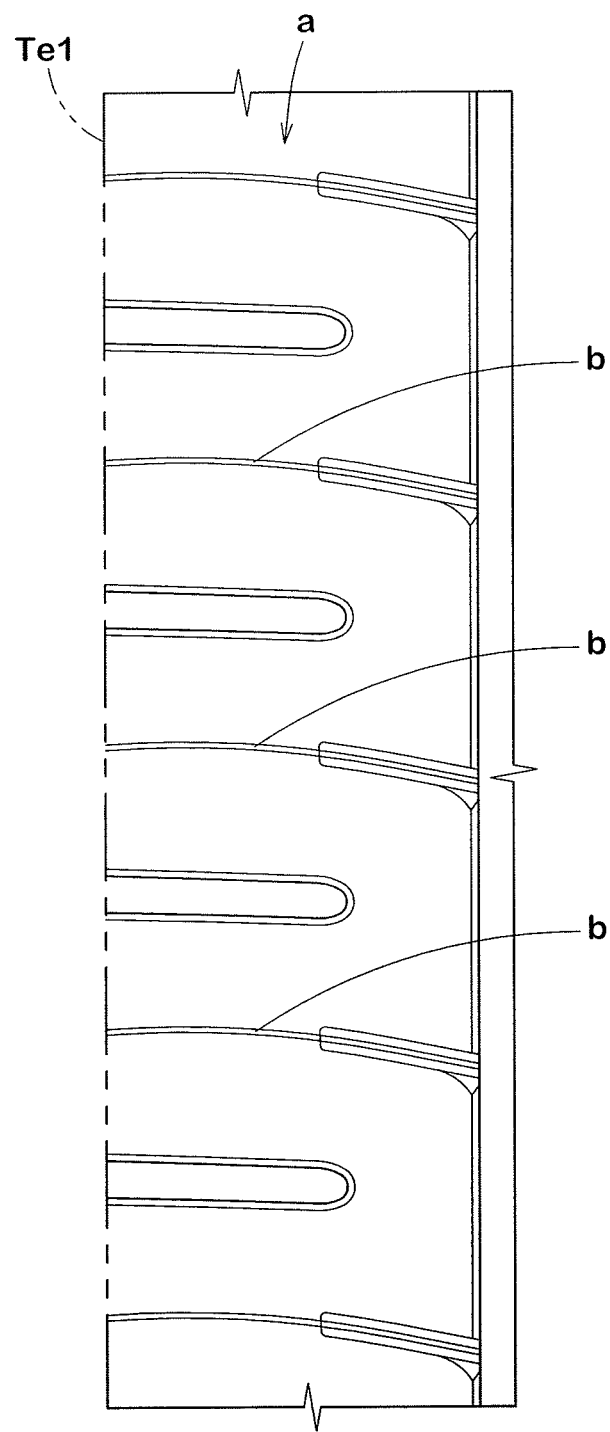
FIG. 12 is an enlarged view of the outer shoulder land region of Comparative Example 1.
Figure 13:
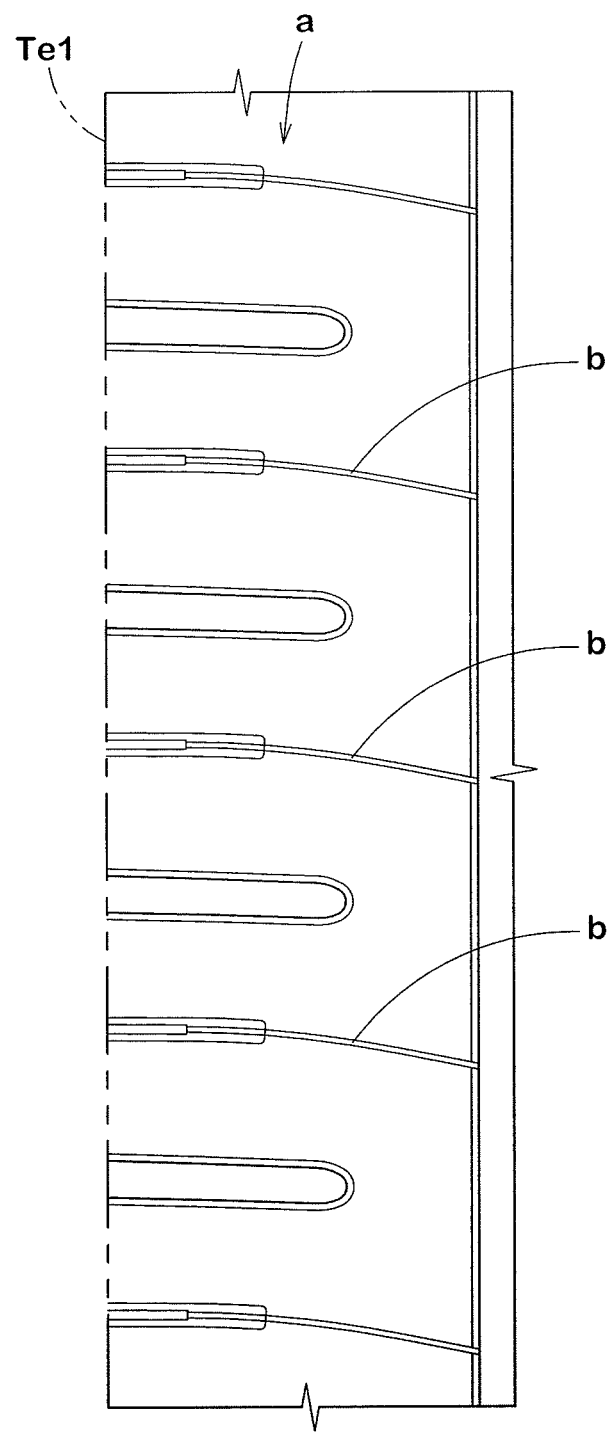
FIG. 13 is an enlarged view of the outer shoulder land region of Comparative Example 2.

Tires of size 195/65R15 having the basic pattern shown in FIG. 1 were made by way of test according to the specifications listed in Table 1. As comparative Example 1, as shown in FIG. 12, tyres each having an outer shoulder land region (a) provided with outer shoulder sipes (b) each extending with a constant width Were made by way of test. As Comparative Example 2, as shown in FIG. 13, tyres each having the wide sipe portions provided on the side of the first tread edge were made by way of test. Each of the outer shoulder sipes (b) of the Comparative Example 1 extends with the same width as the narrow sipe portion of each of the outer shoulder sipes in the embodiment shown in FIG. 1. Each of the wide sipe portions and the narrow sipe portions of the Comparative Example 2 respectively has the same width as those in the embodiment shown in FIG. 1. Each of the tyres of the comparative Examples 1 and 2 had substantially the same tread portion as that shown in FIG. 1 except for the configurations of the outer shoulder sipes. Each of the test tyres was tested for the steering stability and the uneven wear resistance performance of the shoulder land regions. Common specifications of the test tyres and the test methods were as follows.

Tire rim: 15×6.5J
Tire inner pressure: 250 kPa at front wheels, 240 kPa at rear wheels
Test car: front wheel drive car, displacement of 1800 cc
Tire mounting position: all wheels
The test methods were as follows.
<Steering Stability>

While the test car described above was driven on a dry road surface, the steering stability including the initial responsiveness was evaluated by the driver's feeling. The test results are indicated as an evaluation point based on the Comparative Example 1 being 100 wherein the larger the numerical value, the better the steering stability is.

<Uneven Wear Resistance Performance> wear energy of the outer shoulder land region was measured by using a wear energy measuring device. The test results are indicated by an index based on the wear energy of the Comparative Example 1 being 100, wherein the smaller the numerical value, the smaller the wear energy is, which shows more excellent uneven wear resistance performance.

The test results are shown in Table 1.

TABLE 1

| | Comp. 1 | Comp. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| FIG. showing Shoulder land region | FIG. 12 | FIG. 13 | FIG. 3 | FIG. 3 | FIG. 3 | FIG. 3 | FIG. 3 | FIG. 3 | FIG. 3 | FIG. 3 | FIG. 3 |
| Length L2 of Wide sipe portion/Width W2 of shoulder land region | — | 0.22 | 0.22 | 0.15 | 0.20 | 0.25 | 0.30 | 0.22 | 0.22 | 0.22 | 0.22 |
| Depth (d1) of Wide sipe portion/Depth (d2) | — | 1.09 | 1.09 | 1.09 | 1.09 | 1.09 | 1.09 | 1.03 | 1.06 | 1.12 | 1.15 |

TABLE 1-continued

|  | Comp. 1 | Comp. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| of Narrow sipe portion |  |  |  |  |  |  |  |  |  |  |  |
| steering stability [evaluation point] | 100 | 98 | 107 | 105 | 106 | 106 | 104 | 105 | 106 | 106 | 105 |
| Uneven wear resistance performance [index] | 100 | 102 | 96 | 98 | 97 | 96 | 96 | 97 | 97 | 96 | 96 |

From the test results, it was confirmed that the tyres as Examples 1 to 9 had excellent steering stability and that the uneven wear resistance performance of the shoulder land region was improved.

Figure 14:
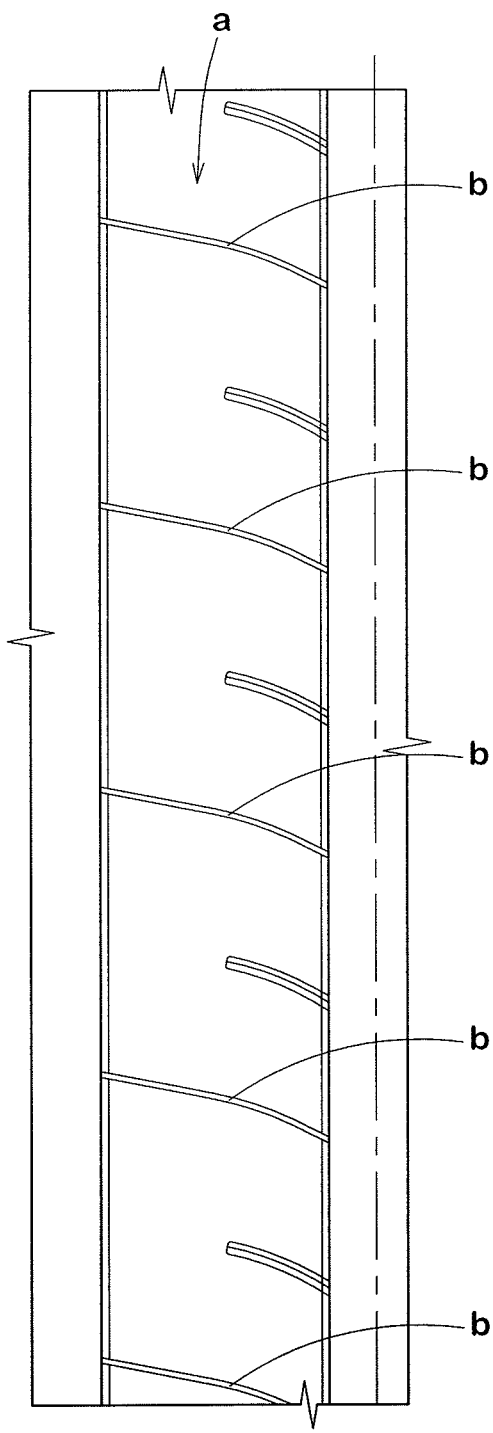
FIG. 14 is an enlarged view of the outer crown land region of Reference 1.
Figure 15:
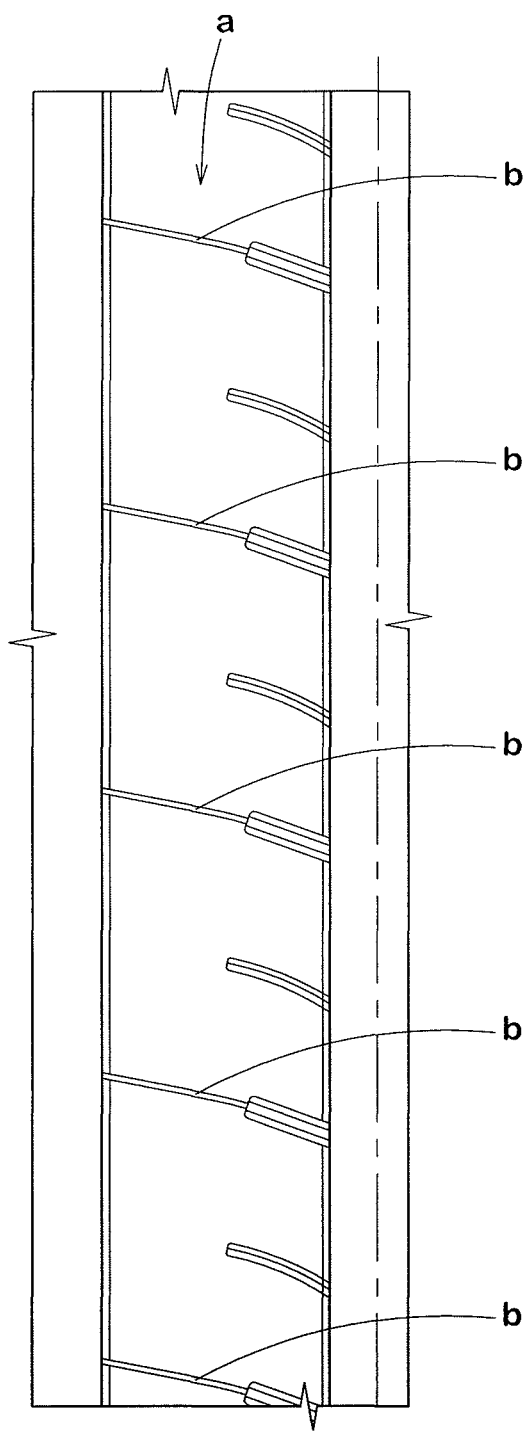
FIG. 15 is an enlarged view of the outer crown land region of Reference 2.

Tires of size 195/65R15 having the basic pattern shown in FIG. 1 were made by way of test according to the specifications listed in Table 1. As Reference 1, as shown in FIG. 14, tyres each having an outer crown land region (a) provided with first outer crown sipes (b) each extending with a constant width Were made by way of test. As Reference 2, as shown in FIG. 15, tyres each having the wide sipe portions provided on the side of the crown main groove were made by way of test. Each of the first outer crown sipes (b) of the Reference 1 extends with the same width as the narrow sipe portion of each of the first outer crown sipes in the embodiment shown in FIG. 1. Each of the wide sipe portions and the narrow sipe portions of the Reference 2 respectively has the same width as those in the embodiment shown in FIG. 1. Each of the tyres of the References 1 and 2 had substantially the same tread portion as that shown in FIG. 1 except for the configurations of the first outer crown sipes. Each of the test tyres was tested for the steering stability and the uneven wear resistance performance of the crown land region. Common specifications of the test tyres and the test methods are as follows.

Tire rim: 15×6.5J
Tire inner pressure: 250 kPa at front wheels, 240 kPa at rear wheels
Test car: front wheel drive car, displacement of 1800 cc
Tire mounting position: all wheels
The test methods were as follows.
<Steering Stability>
While the test car described above was driven on a dry road surface, the steering stability including the initial responsiveness was evaluated by the driver's feeling. The test results are indicated as an evaluation point based on the Reference 1 being 100 wherein the larger the numerical value, the better the steering stability is.

<Uneven Wear Resistance Performance>
The wear energy of the outer crown land region was measured by using the wear energy measuring device. The test results are indicated by an index based on the wear energy of the Reference 1 being 100, wherein the smaller the numerical value, the smaller the wear energy is, which shows more excellent uneven wear resistance performance.

The test results are shown in Table 2.

TABLE 2

|  | Ref. 1 | Ref. 2 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| FIG. showing Shoulder land region | FIG. 14 | FIG. 15 | FIG. 5 | FIG. 5 | FIG. 5 | FIG. 5 | FIG. 5 | FIG. 5 | FIG. 5 | FIG. 5 | FIG. 5 |
| Length L2 of Wide sipe portion/width W2 of shoulder land region | — | 0.35 | 0.35 | 0.25 | 0.30 | 0.40 | 0.45 | 0.35 | 0.35 | 0.35 | 0.35 |
| Depth (d1) of wide sipe portion/Depth (d2) of Narrow sipe portion | — | 1.09 | 1.09 | 1.09 | 1.09 | 1.09 | 1.09 | 1.03 | 1.06 | 1.12 | 1.15 |
| Steering stability [evaluation point] | 100 | 99 | 106 | 103 | 105 | 105 | 104 | 105 | 106 | 105 | 104 |
| Uneven wear resistance performance [index] | 100 | 99 | 95 | 97 | 96 | 96 | 96 | 97 | 97 | 95 | 96 |

From the test results, it was confirmed that the tyres as the Examples 10 to 18 had excellent steering stability and that the uneven wear resistance performance of the crown land region was improved.

The invention claimed is:
1. A tire comprising:
a tread portion comprising a first tread edge, a shoulder main groove extending continuously in a tire circumferential direction between the first tread edge and a tire equator, and a shoulder land region defined between the first tread edge and the shoulder main groove, wherein
the shoulder land region is provided with a shoulder sipe extending in a tire axial direction with a width less than 1.5 mm,
the shoulder sipe includes a narrow sipe portion and a wide sipe portion having a width in a non-chamfered portion that is larger than that of the narrow sipe portion, and
the wide sipe portion is arranged on a side of the shoulder main groove.
2. The tire according to claim 1, wherein
the tread portion includes a crown main groove extending adjacently to the shoulder main groove and continuously in the tire circumferential direction, and a crown land region defined between the shoulder main groove and the crown main groove,
the crown land region is provided with a crown sipe extending in the tire axial direction with a width less than 1.5 mm, the crown sipe includes a first crown sipe crossing the crown land region, the first crown sipe includes a narrow sipe portion and a wide sipe portion having a width in a non-chamfered portion that is larger than that of the narrow sipe portion, and the wide sipe portion of the first crown sipe is connected with the shoulder main groove.

3. The tire according to claim 2, wherein
a length in the tire axial direction of the narrow sipe portion of the first crown sipe is larger than a length in the tire axial direction of the wide sipe portion of the first crown sipe.

4. The tire according to claim 2, wherein
the shoulder sipe is arranged so as to be continuous with the first crown sipe with the shoulder main groove therebetween.

5. The tire according to claim 4, wherein
the shoulder sipe includes a portion linearly continuous with the first crown sipe with the shoulder main groove therebetween.

6. The tire according to claim 1, wherein
the wide sipe portion is connected with the shoulder main groove,
the narrow sipe portion is connected with the first tread edge, and
a length in the tire axial direction of the narrow sipe portion is larger than a length in the tire axial direction of the wide sipe portion.

7. The tire according to claim 6, wherein
a depth of the wide sipe portion is larger than a depth of the narrow sipe portion.

8. The tire according to claim 6, wherein
the shoulder land region is provided with a plurality of the shoulder sipes arranged at intervals in the tire circumferential direction, and
a shoulder lateral groove extending from the first tread edge and terminating without being connected with the shoulder main groove is arranged between a pair of the shoulder sipes adjacent to each other in the tire circumferential direction.

9. A tire comprising:
a tread portion comprising a first tread edge, a shoulder main groove extending continuously in a tire circumferential direction between the first tread edge and a tire equator, and a shoulder land region defined between the first tread edge and the shoulder main groove, wherein
the shoulder land region is provided with a shoulder sipe extending in a tire axial direction with a width less than 1.5 mm,
the shoulder sipe includes a narrow sipe portion and a wide sipe portion having a width larger than that of the narrow sipe portion,
the wide sipe portion is arranged on a side of the shoulder main groove,
a narrow groove portion extends from the shoulder main groove,
the entire wide sipe portion and a part of the narrow sipe portion extend inwardly in a tire radial direction from a groove bottom of the narrow groove portion, and
the narrow sipe portion extends axially outwardly from an axially outer end of the wide sipe portion so as to extend beyond an axially outer end of the narrow groove portion to be connected with the first tread edge.

10. The tire according to claim 9, wherein
a length in the tire axial direction of the narrow sipe portion is larger than a length in the tire axial direction of the wide sipe portion.

11. The tire according to claim 9, wherein
a depth of the wide sipe portion is larger than a depth of the narrow sipe portion.

12. The tire according to claim 9, wherein
a direction of the tread portion when mounted on a vehicle is specified, and
when the tire is mounted on a vehicle, the first tread edge is located on an outer side of the vehicle.

13. The tire according to claim 9, wherein
the tread portion includes a crown main groove extending adjacently to the shoulder main groove and continuously in the tire circumferential direction, and a crown land region defined between the shoulder main groove and the crown main groove,
the crown land region is provided with a crown sipe extending in the tire axial direction with a width less than 1.5 mm,
the crown sipe includes a first crown sipe crossing the crown land region,
the first crown sipe includes a narrow sipe portion and a wide sipe portion having a width larger than that of the narrow sipe portion, and
the wide sipe portion of the first crown sipe is connected with the shoulder main groove.

14. The tire according to claim 13, wherein
the shoulder sipe is arranged so as to be continuous with the first crown sipe with the shoulder main groove therebetween.

15. The tire according to claim 9, wherein
a length in the tire axial direction of the narrow sipe portion of the shoulder sipe is in the range of from 3.0 to 4.5 times a length in the tire axial direction of the wide sipe portion of the shoulder sipe.

16. The tire according to claim 9, wherein
a length in the tire axial direction of the narrow groove portion of the shoulder sipe is in the range of from 1.5 to 2.5 times a length in the tire axial direction of the wide sipe portion of the shoulder sipe.

17. A tire comprising:
a tread portion comprising a first tread edge, a shoulder main groove extending continuously in a tire circumferential direction between the first tread edge and a tire equator, and a shoulder land region defined between the first tread edge and the shoulder main groove, wherein
the shoulder land region is provided with a shoulder sipe extending in a tire axial direction with a width less than 1.5 mm,
the shoulder sipe includes a narrow sipe portion and a wide sipe portion having a width larger than that of the narrow sipe portion,
the wide sipe portion is arranged on a side of the shoulder main groove,
the shoulder land region is provided with a plurality of the shoulder sipes arranged at intervals in the tire circumferential direction, and
a shoulder lateral groove extending from the first tread edge and terminating without being connected with the shoulder main groove is arranged between a pair of the shoulder sipes adjacent to each other in the tire circumferential direction, and
an inner end in the tire axial direction of the shoulder lateral groove is located on an outer side in the tire axial direction of an outer end in the tire axial direction of the wide sipe portion of each of the shoulder sipes.

18. The tire according to claim 17, wherein
the shoulder land region is provided with a narrow groove portion having a width not less than 1.5 mm and a depth not more than 2.0 mm, and
the wide sipe portion extends inwardly in a tire radial direction from a groove bottom of the narrow groove portion, and
in the tire axial direction, the inner end in the tire axial direction of the shoulder lateral groove is positioned between the outer end in the tire axial direction of the wide sipe portion and an outer end in the tire axial direction of the narrow groove portion.

19. The tire according to claim 17, wherein
in a connecting portion of the narrow groove portion with the shoulder main groove, a portion between at least one of groove walls and a tread ground contacting surface is chamfered so that the groove width gradually increases toward the shoulder main groove.

20. The tire according to claim 19, wherein
the shoulder sipe is arranged so as to be continuous with the first crown sipe with the shoulder main groove therebetween.

\* \* \* \* \*